Figure 1:
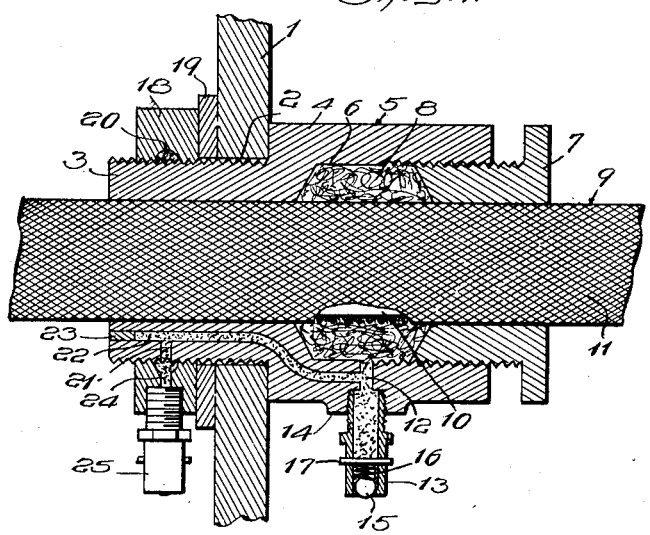

May 12, 1931.  R. M. WEEKS  1,805,155
STUFFING BOX
Filed Oct. 29, 1929

Witness:
William P. Kilroy

Inventor:
Ralph M. Weeks
By Brown, Jackson, Boettcher & Dienner,
Attys.

Patented May 12, 1931

1,805,155

UNITED STATES PATENT OFFICE

RALPH M. WEEKS, OF NEW LONDON, CONNECTICUT, ASSIGNOR TO ELECTRIC BOAT COMPANY, OF GROTON, CONNECTICUT, A CORPORATION OF NEW JERSEY

STUFFING BOX

Application filed October 29, 1928. Serial No. 315,652.

This invention relates to stuffing boxes and similar structures, and more particularly to a stuffing box specially adapted for use on submarine boats.

In submarine boats space is at a premium and the cables for conveying current to different localities on the boat are, of necessity, stacked or banked close together. These cables pass through stuffing boxes which are secured through the bulkheads of the boat. It is of the utmost importance that these stuffing boxes remain both gas and watertight, particularly in the event of collision or other accident to the boat. Due to the necessity of banking the cables close together, it is impracticable, and in fact frequently impossible, to repack or adjust the stuffing boxes after they have once been installed and the boat has gone into service.

The stuffing boxes for the cables are commonly packed with hemp packing and grease. After the boxes have been in use for some time, the grease dries up and the packing loosens, with the result that the stuffing box is no longer pressure resistant and gas and watertight. A further objection to the common type of stuffing boxes now in use is that such boxes cannot be adjusted from the blind side of the bulkhead, that is, from the side opposite to that at which the gland nut is disposed, even if it were otherwise possible to get at the stuffing box and adjust the same.

One of the main objects of my invention is to provide a stuffing box having associated therewith means whereby a suitable sealing fluid can be injected into the packing space of the box from either side of the bulkhead, whereby the box may be rendered pressure resistant and gas and watertight. By periodically injecting a suitable fluid into the packing space, the box can be maintained in a leakproof condition. In the event of a casualty, if the box should be found to be leaking, it can be quickly rendered leaktight by injecting the sealing fluid into the box from either side of the bulkhead. A further object of my invention is to provide a stuffing box which will assure a gas and watertight closure about a member passing through the box and provided with an irregular or indented outer surface, such as an armored cable.

Further objects and advantages of my invention will appear from the detailed description.

In the drawings:—

Figure 2:
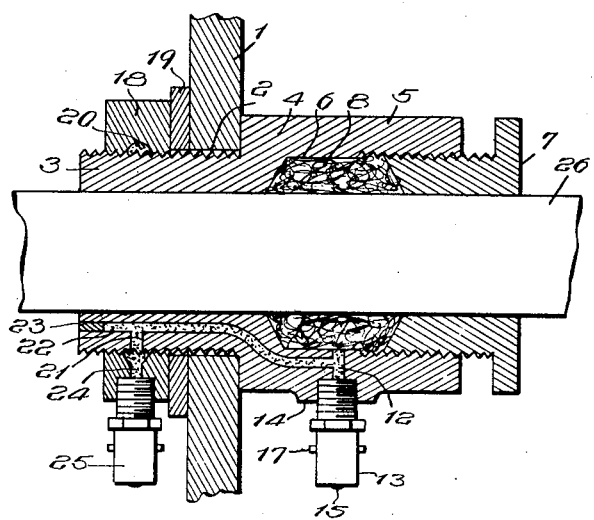

Fig. 1 is an axial sectional view through a stuffing box constructed in accordance with my invention, as applied to an armored cable; and Fig. 2 is a view similar to Fig. 1, showing the box as applied to a member having a smooth outer surface.

I have illustrated my stuffing box as applied to a partition member 1, such as a bulkhead in a submarine boat. This member is provided with an opening 2, through which is inserted a reduced exteriorly threaded neck 3 which extends from body 4 of a stuffing box 5. The body 4 is bored out from its other end to provide a packing space 6 and is interiorly threaded for reception of a gland nut 7 which screws into the body and compresses packing 8, disposed in space 6, about a cable 9 which passes through the stuffing box. This cable is provided with a lead sheathing 10 and is enclosed in an armor 11. This armor is formed of steel wires woven together in a basket weave over the lead sheathing 10. The outer surface of cable 9 is, therefore, uneven and provided, in effect, with numerous indentations or spaces between the interwoven wires of the armor 11. In practice it is quite difficult to obtain a gas and watertight closure about an armored cable when using a stuffing box of ordinary construction.

Body 4 of the stuffing box is provided with a duct 12 extending outwardly from the central portion of packing space 6. This duct opens, at its outer end, into a tubular nipple or fitting 13 which screws into a boss 14 extending from body 4. The fitting 13 is of known construction, being that provided by the Alemite Company, and comprises an inwardly opening valve 15 normally held in closed or seated position by a spring 16. The fitting is also provided with outwardly projecting pins 17 for cooperation with slots in a sleeve or tubular element at one end of a tube which is connected at its other end to a suitable grease gun or other suitable source of supply of grease or other fluid under pressure.

A nut 18 is screwed onto neck 3 at the opposite side of the partition member or bulkhead 1 from body 4 and is turned up tight against a washer 19 confined between the nut and the bulkhead and co-acting therewith to provide a fluid tight and pressure resistant closure between the stuffing box and the bulkhead. This nut is provided with an inner circumferential groove 20 of a width to encompass a port 21 opening through the neck 3 radially thereof. This port opens into a duct 22 extending through neck 3 and a portion of body 4 and opening into duct 12. The outer end of duct 22 is closed by a plug 23 suitably secured therein. The nut 18 is provided with a short duct 24 extending from groove 20 and opening into a fitting 25 similar to fitting 13, this fitting 25 being suitably secured in the nut 18 as by being screwed thereinto.

I have found that injecting a suitable fluid, such as oil or grease into the packing 8 renders it possible to obtain a gas and watertight closure about an armored cable. This is probably due to the fact that the oil or grease acts as a lubricant to facilitate entry of the packing into the interstices of the armor and about the cable, and this oil or grease also probably acts to fill any of the smaller spaces about the cable into which the packing does not readily penetrate, sealing such spaces and assuring a gas and watertight closure about the cable. As previously noted, after a stuffing box has been in use for some time, the oil or grease in the packing dries out and the packing loosens with the result that the box is no longer pressure resistant, and gas and watertight. It is possible, by my invention, to inject grease or oil into the box and into the packing space 6 thereof, periodically, so as to assure that the stuffing box is maintained in proper condition to form a gas and watertight closure about the cable. A further advantage of my invention is that the sealing fluid can be injected into the packing space 6 of the stuffing box from either side of the bulkhead 1. In practice each compartment of the submarine boat will carry a grease gun and an adequate supply of grease or other sealing fluid. In the event of collision or other accident, men at the blind side of the bulkhead 1 can inject grease or oil into the stuffing box in the event that water or gas tends to leak through this box. This is highly advantageous, as will be appreciated.

While I have illustrated my invention in Fig. 1, and described it above, as being applied particularly to armored cables, it is also well adapted for various other uses. As an example, it is of use in connection as leads for steering gear, stern tubes, motor shafts and various other members of like nature extending through bulkheads. In Fig. 2 I have illustrated the stuffing box as used in connection with a member 26 having a smooth outer surface and which may be considered as corresponding to a shaft, lead or other member extending through the bulkhead 1.

Under certain conditions, it may be desirable to form a permanent joint about the member passing through the stuffing box. When this is desired, instead of forcing oil or grease into the stuffing box to lubricate the flax-packing, red-lead, litharge and glycerine, or other substances, which will effectively close all spaces about the cable or other member passing through the stuffing box and will harden, is injected into the packing space 6. It is thus possible, by my invention, to maintain the stuffing box in gas and watertight condition at all times from either side of the bulkhead or partition member, or, if desired, to provide a permanent gas and watertight closure about the cable or other member when this becomes desirable.

What I claim is:—

1. In combination, a partition, a stuffing box comprising a body having a reduced neck extending through the partition, the body having a packing space and being provided with two ducts communicating with said space, one of the ducts opening through the body and the other duct extending through the neck and opening therethrough at the opposite side of the partition from said body, a nut screwed onto the neck and cooperating with said body for clamping the stuffing box to the partition, means forming a fluid tight closure between said stuffing box and the partition, the nut having a circumferential groove in its inner face encompassing the outer opening of the neck duct and the nut having a duct opening into said groove, tubular fittings secured in the outer ends of the body duct and the nut duct, respectively, and inwardly opening valves normally closing said fittings.

2. In combination, a partition, a stuffing box having a neck extending through the partition and a shoulder contacting one face of said partition, said stuffing box having a packing space, a nut screwing onto said neck at the other side of the partition and cooperating with said shoulder for clamping the stuffing box to said partition, a tubular fitting carried by the nut and having a normally closed inwardly opening valve, and a second fitting carried by said stuffing box at the other side of the partition and having a normally closed inwardly opening valve, the stuffing box and the nut having ducts establishing communication between said fittings and the packing space.

3. In combination, a partition, a stuffing box having a body and a neck extending therefrom through the partition, means securing the stuffing box to the partition and forming a fluid tight closure therebetween, said means including a nut screwing onto the neck, said body having a packing space, and means for injecting sealing fluid into said space through the nut at one side of the partition or through the body at the other side of the partition, optionally, and while the stuffing box remains in assembled condition.

4. In combination, a partition, a stuffing box having a body and a neck extending therefrom through the partition, a member extending through the stuffing box and having depressions in its outer surface, a nut screwing onto the neck at the opposite side of the partition from the body, said stuffing box comprising a packing surrounding said member and a gland nut for compressing said packing, means for injecting a sealing fluid through the body into the packing while the stuffing box remains in assembled condition, and means for injecting a sealing fluid through the nut into the packing while the stuffing box remains assembled.

5. In combination, a stuffing box comprising a body and a neck extending therefrom, said body having a packing space, a nut screwing onto the neck, means for injecting sealing fluid through the nut into said space, and means for injecting sealing fluid through the body into the sealing space.

6. In combination, a stuffing box comprising a body and a neck extending therefrom, said body having a packing space, a nut screwing onto the neck, a tubular fitting carried by the nut and having a normally closed inwardly opening valve, and a similar fitting carried by the body, the body and the nut having ducts establishing communication between the packing space of the body and the fittings.

7. In combination, a partition, a stuffing box structure extending through the partition and having an abutment contacting one side of the partition and holding the structure against movement through the partition in one direction, and securing means at the other side of the partition holding the stuffing box structure against movement through the partition in the other direction, the stuffing box structure being provided with a packing space and said structure and the securing means having communicating ducts opening at opposite sides of the partition, said ducts opening into the packing space.

8. In combination, a partition, a stuffing box extending through the partition and having a shoulder contacting one face of said partition, securing means contacting the other side of the partition and including a nut screwing onto the stuffing box, the stuffing box having a packing space and said box and the nut being provided with ducts opening at opposite sides of the partition and communicating with said space.

In witness whereof, I hereunto subscribe my name this 22 day of Oct., 1928.
RALPH M. WEEKS.